US012695126B2

(12) United States Patent
Masuch

(10) Patent No.: US 12,695,126 B2
(45) Date of Patent: Jul. 28, 2026

(54) METHOD FOR TESTING AT LEAST ONE BATTERY CELL STACK WITH REGARD TO THE POSITION OF BATTERY CELL LAYERS

(71) Applicant: Volkswagen Aktiengesellschaft, Wolfsburg (DE)

(72) Inventor: Steffen Masuch, Braunschweig (DE)

(73) Assignee: PowerCo SE, Salzgitter (DE)

( * ) Notice: Subject to any disclaimer, the term of this patent is extended or adjusted under 35 U.S.C. 154(b) by 347 days.

(21) Appl. No.: 18/387,025

(22) Filed: Nov. 4, 2023

(65) Prior Publication Data

US 2024/0154194 A1     May 9, 2024

(30) Foreign Application Priority Data

Nov. 4, 2022    (DE) ..................... 10 2022 211 683.6

(51) Int. Cl.
  *G01T 1/00*      (2006.01)
  *G01T 1/16*      (2006.01)
  *G01T 1/161*     (2006.01)
  *H01M 10/42*     (2006.01)
  *H01M 10/48*     (2006.01)
  *H04N 23/11*     (2023.01)

(52) U.S. Cl.
  CPC ......... *H01M 10/482* (2013.01); *G01T 1/1603* (2013.01); *G01T 1/1615* (2013.01); *H01M 10/4285* (2013.01); *H04N 23/11* (2023.01)

(58) Field of Classification Search
  CPC .. H01M 10/04; H01M 10/0585; H01M 50/46; G01B 15/00
  See application file for complete search history.

(56) References Cited

U.S. PATENT DOCUMENTS

| 11,378,527 | B2 | 7/2022 | Heo et al. |
| 2012/0148880 | A1 | 6/2012 | Schaefer et al. |
| 2023/0003670 | A1 | 1/2023 | Kraken et al. |
| 2023/0006239 | A1* | 1/2023 | Song ................. H01M 10/0413 |
| 2023/0075603 | A1 | 3/2023 | Yagi et al. |

(Continued)

FOREIGN PATENT DOCUMENTS

| DE | 102009018079 | A1 | 10/2010 |
| DE | 102012215120 | B4 | 4/2017 |
| DE | 102017113534 | A1 | 12/2018 |

(Continued)

*Primary Examiner* — Dani Fox
(74) *Attorney, Agent, or Firm* — Muncy, Geissler, Olds & Lowe, P.C.

(57)     ABSTRACT

A method for testing a stack of multiple battery cells, each comprising an anode, a cathode, and a separator as types of battery cell layers, wherein the separator is arranged between the anode and the cathode. In a first test step, it is checked whether the edges of the battery cell layers are within a first tolerance range, wherein the battery cells to which this applies are determined to be usable battery cells. Several of the usable battery cells are stacked to the battery cell stack. The battery cell stack is irradiated by X-rays. Via the X-rays, positions of those edges of a type of battery cell layers are determined which delimit at least two of the corners of these battery cell layers, checking whether the greatest distance between the equally located edges of each of the battery cell layers of the selected type is within a second tolerance range.

13 Claims, 10 Drawing Sheets

(56)        References Cited

U.S. PATENT DOCUMENTS

2025/0189465  A1*   6/2025  Kim .......................... G06T 7/13

FOREIGN PATENT DOCUMENTS

| DE | 102020112814 | A1 | 11/2020 |
|----|----|----|----|
| DE | 102021117152 | A1 | 1/2023 |
| EP | 4044306 | A1 | 8/2022 |
| JP | 2018087740 | A | 6/2018 |
| KR | 102236815 | B1 | 4/2021 |
| WO | WO2021171946 | A1 | 9/2021 |

* cited by examiner 4, 4a 4, 4b

1

1

4, 4a 2, 2a 2, 2a

3

2, 2b 2, 2b 4, 4b

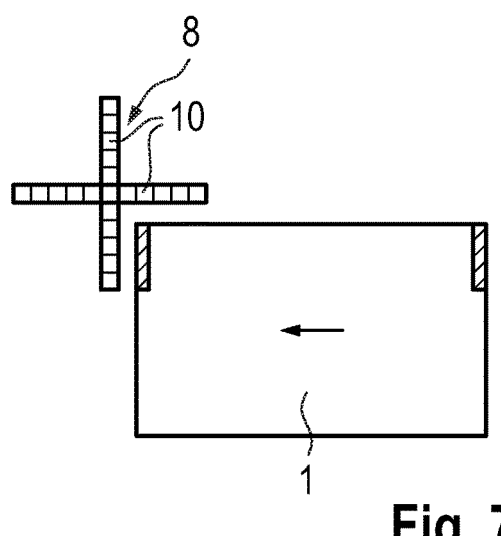
Fig. 7
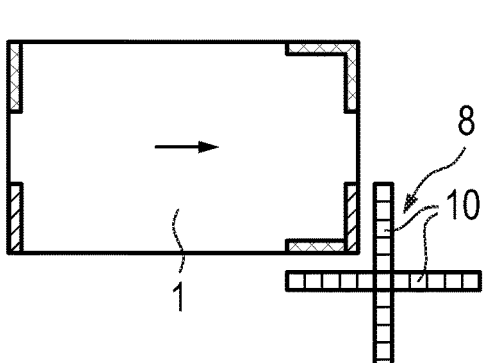
Fig. 9
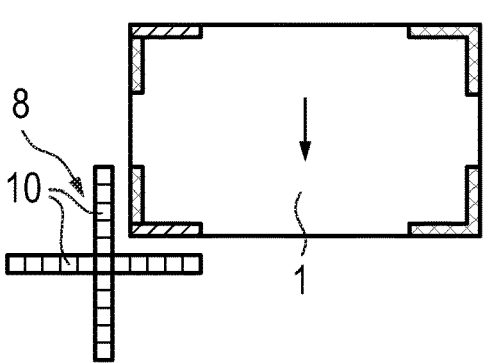
Fig. 8
Fig. 10
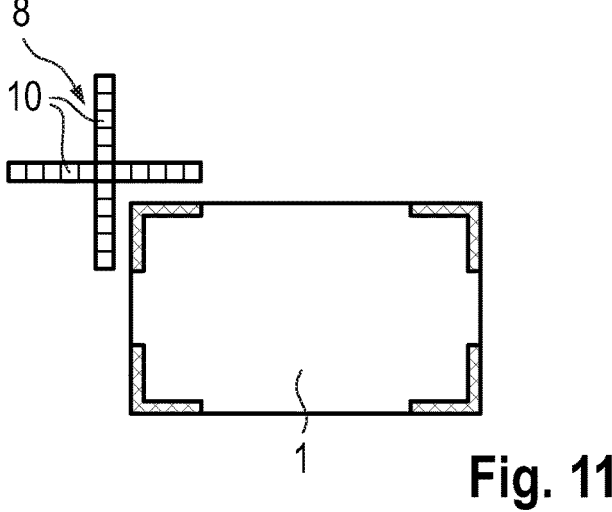
Fig. 11

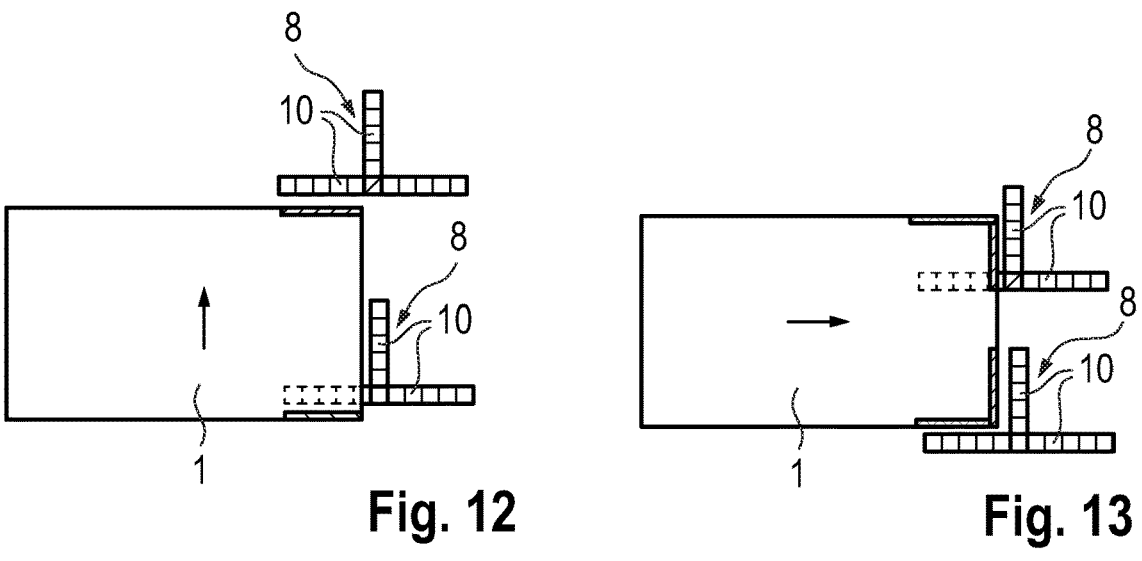
Fig. 12
Fig. 13
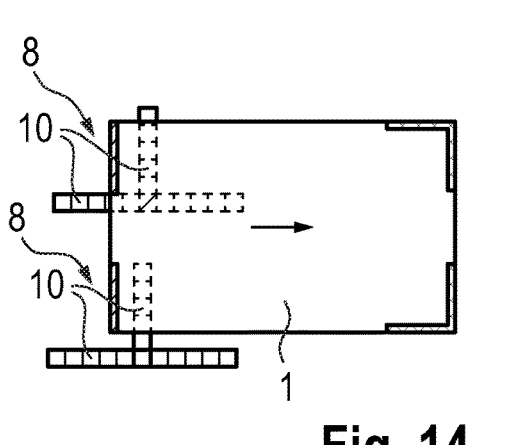
Fig. 14
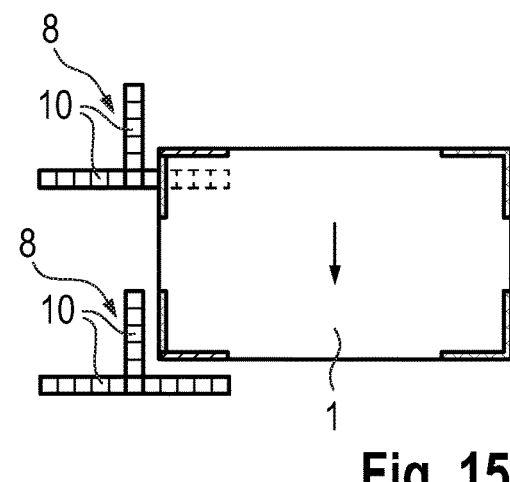
Fig. 15
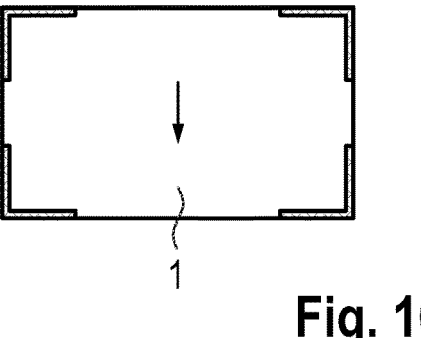
Fig. 16

METHOD FOR TESTING AT LEAST ONE BATTERY CELL STACK WITH REGARD TO THE POSITION OF BATTERY CELL LAYERS

This nonprovisional application claims priority under 35 U.S.C. § 119(a) to German Patent Application No. 10 2022 211 683.6, which was filed in Germany on Nov. 4, 2022, and which is herein incorporated by reference.

BACKGROUND OF THE INVENTION

Field of the Invention

The invention relates to a method for testing at least one stack of several battery cells (battery cell stacks), each comprising an electrode designed as an anode, an electrode designed as a cathode and at least one separator as different types of plate-shaped battery cell layers, wherein the separator is arranged between the electrodes and wherein the battery cell layers are polygonal large areas with at least partially different sizes and are stacked in a direction perpendicular to the large areas. Such a battery cell stack, also known as an electrode-separator composite (ESV), can be intended in particular as a component of a battery.

Description of the Background Art

In the automated production of batteries, the battery cell layers are stacked to form battery cell stacks by means of stacking machines, wherein the placement accuracy of the battery cell layers and especially the electrodes is the quality criterion for the process capability of the stacking machines. All edges of the polygonal, and in particular rectangular, battery cell layers must be at a defined distance from each other and within a defined tolerance range, in order to ensure the best possible electrochemical performance of the batteries on the one hand, and also to avoid a short circuit between adjacent electrodes, one of which will serve as the anode and the other as the cathode of the battery cell, as a result of insufficiently precise stacking. Such a short circuit could lead to a failure of the affected battery.

It may be intended to dimension the separator of a battery cell stack to such an extent that said separator is larger than the anode and the anode in turn larger than the cathode in such a way that there is a protrusion of 1 millimeter between the separator and the anode or the anode and cathode over the entire circumference, in order to reliably prevent a short circuit between adjacent electrodes as a result of insufficiently precise stacking, taking into account the placement accuracy of currently used stacking machines. Such a protrusion can also prevent reduced chemical performance of the battery cell stacks due to inaccurate positioning of the electrodes. However, such tolerance-related oversizing of the anodes and separators increases the material consumption in the production of the battery cell stacks and thus the costs, space requirements and weight of the battery cell stacks and thus the batteries. It can therefore be useful to minimize such tolerance-related overdimensioning of battery cell layers in battery cell stacks. To this end, in order to avoid a short circuit between adjacent electrodes as a result of insufficiently precise stacking, the placement accuracy of the stacking machines used for stacking should be increased and/or the quality assurance in the context of the production of the battery cell stacks should be improved so that the production of short-circuited battery cell stacks can be avoided sufficiently reliably or they can be safely sorted out during production.

DE 10 2009 018 079 A1, which corresponds to US 2012/0148880, discloses a test of a battery, in particular in a certain operating state, by means of electromagnetic radiation, for example X-rays, wherein the relative orientation of the anode and the cathode of at least one battery cell of the battery can also be checked.

DE 10 2020 112 814 A1, which corresponds to US 2020/0363344, discloses a method for testing batteries, wherein images of a large number of stacked battery cells are acquired using radioactive radiation, such as X-rays.

SUMMARY OF THE INVENTION

It is therefore an object of the invention to provide a method for determining the placement accuracy of the battery cell layers of a battery cell stack, which can be carried out as easily and/or quickly as possible with sufficient accuracy.

According to an exemplary embodiment of the invention, a method for testing at least one stack of several battery cells, i.e., one battery cell stack, is provided, wherein the battery cells may each comprise an electrode designed as an anode, an electrode designed as a cathode and at least one separator (separating and electrically insulating the anode and the cathode) as different types of plate-shaped battery cell layers, wherein the separator is arranged between the electrodes and wherein the battery cell layers have polygonal and preferably rectangular large areas of at least partially different sizes and are stacked in a stacking direction that is perpendicular to the large areas. The two electrodes of a battery cell differ in terms of an included active material, whereby the electrode designed as an anode is anodic and the electrode designed as a cathode is cathodic (in each case related to a discharge of the battery cell).

"Plate-shaped" can mean a body or a section of a body (e.g., in the case of a meandering course of a separator band, wherein the sections of it lying between the adjacent electrodes are plate-shaped separators) which has two (external) large surfaces extending in a longitudinal and a broad direction of the body, wherein a (maximum) height of the body, which corresponds to the (maximum) distance of the large areas, is smaller (in particular not more than $\frac{1}{10}$ or $\frac{1}{100}$ or $\frac{1}{1000}$) than the (maximum) length and the (maximum) width.

In a first test step of the method, the relative position of the battery cell layers of the still isolated battery cells is determined and it is checked whether distances from (some or all) edges of the battery cell layers are within a first tolerance range, wherein the battery cells for which a positive test has been carried out, i.e., which meet the requirements of the first test step, are determined to be usable battery cells.

Subsequently, several of the usable battery cells are stacked to form the battery cell stack and in a second test step, the battery cell stack is irradiated by means of X-rays emitted by an X-ray emitter and detected by an X-ray detector, wherein the X-ray radiation (i.e., at least one beam, in particular the central beam of it) is oriented perpendicular to the large areas of the battery cell layers. The battery cell stack should be moved relative to the X-rays. The detected X-rays are then used to determine the location, preferably the position, of the edges of (only) one type of battery cell layers, i.e., the cathodes, the separators or, preferably, the anodes, checking whether the greatest distance between the corresponding edges of all battery cell layers of the selected type is within a second tolerance range. In order to achieve a sufficiently safe and accurate test result, at least those edges of the type of battery cell layers under consideration are taken into account, which border at least two of the corners (defined as the transition of two non-coaxial straight sides of the large area, which does not have to be tapered) of these battery cell layers. In particular, these two corners can be diagonally opposite corners.

In the first test step, therefore, the individual battery cells will be checked with regard to the spacing of the edges of their battery cell layers and those battery cells will be selected that meet the relevant quality criteria and are therefore used for the formation of the battery cell stack. This significantly simplifies the second test step, in which the battery cell stack is checked as a whole. In this case, only the locations, preferably the positions, of the edges of one type of battery cell layers, in particular the anodes, can be determined and checked with regard to an arrangement within the second tolerance range. This enables a simple and fast inspection of the battery cell stack and thus also an advantageous integration into an automated manufacturing process for batteries. In particular, the combination of the two test steps according to the invention makes it possible to carry out the second test step under the "supervision" of the X-rays, i.e., with the X-ray emitter's "view" of the large areas of the battery cell layers and especially preferably with the vertical orientation of a central beam of X-rays with respect to these large areas, whereby an advantageous detection of the edges of at least the type of battery cell layers under consideration is possible.

The battery cell layers can already be immovably connected to each other when the first test step is carried out, in particular that they are bonded or laminated. This ensures that the layers of the battery cell layers of the individual battery cells determined in the first test step do not change during the subsequent stacking and also during the second test step, and that the relevant test results can therefore be taken into account without errors in the evaluation in the second test step. Alternatively, however, changing the layers of the battery cell layers of the battery cells during stacking and during the second test step can be prevented by other measures, such as a fixing device temporarily used to fix the battery cell layers. When stacking, deformation and especially kinking of the battery cell layers should be avoided. The battery cell layers that are already connected to each other can have a beneficial effect in this regard.

The battery cells used in the course of the method according to the invention can preferably be designed in such a way that the large areas of the anode are larger than the large areas of the cathodes and the large areas of at least one separator are larger than the large areas of the cathode and preferably also larger than the large areas of the anode.

Due to the different sizes of the large areas, a protrusion of the relatively large battery cell layers (separator and anode) should be realized on all sides with respect to the next smaller battery cell layers. This allows for an advantageous execution of both test steps, which may be due to the different absorption behavior of these different battery cell layers for both visible light and X-rays. This different absorption behavior may be due to the different materials from which the different battery cell layers are designed. In both cases (i.e., visible light and X-rays), the absorption behavior of the cathodes can be highest and that of the separators the lowest in both cases.

With regard to the first test step, it may therefore be preferable that the determination of the positions of the battery cell layers of the individual battery cells can be carried out on the basis of the image of an optical camera system, i.e., by means of a visible light-based image-generating system comprising one or more cameras, which allows for the first test step to be carried out easily and cost-effectively. In this case, the image acquisition of a camera of the camera system can preferably be taken from above, i.e., with a "view" onto the large areas of the battery cell layers and especially preferably with a vertical alignment of the optical axis of the camera of the camera system with respect to these large areas. This can also be advantageous in terms of carrying out the first test step, because it allows for a section of the battery cells to be detected that is as large as possible with the edges to be detected, preferably all edges of the battery cell layers completely. Due to the highest absorption behavior for visible light, the cathode of each individual battery cell can be seen in the image, even though it may be completely covered by at least one other of the battery cell layers as the smallest of the battery cell layers. Furthermore, at least the edges of the anode can be seen in the image. This is true at least if, as is preferable, the anode is larger than the cathode. The at least one separator placed between the anode and cathode of each of the battery cells is preferably larger than at least the cathode (and preferably also larger than the cathode) in order to realize sufficient separation of the anode and the cathode with the aim of electrical isolation. Furthermore, at least one separator can also be advantageously recognizable on the image of the camera system. At least one separator is particularly advantageously recognizable if it is larger than the anode, which can also have a particularly advantageous effect on the separation of the anode and the cathode. Although the at least one separator may completely cover the anode or cathode, depending on the orientation of the battery cell with respect to the camera, the absorption behavior of this separator may be so low that this does not prevent at least the edges of the anode or cathode from being detected. This also applies to one or more additional separators, which may be arranged on the otherwise exposed side of the anode or cathode. An arrangement of light sources of the camera system can preferably be such that a first light source is placed on the same side with respect to the individual battery cells (and preferably in approximately the same place) as the camera and a second light source on the opposite side with respect to the individual battery cells. The execution of the first test step can therefore be based on a combination of incident light and transmitted light detection.

A particularly advantageous evaluable image can be determined in the first test step if the large areas of the at least one separator are larger than the large areas of the anode and the large areas of the anode are larger than the large areas of the cathode, wherein the image of the camera system is taken in view and the cathode is closer to the camera of the camera system than the anode when the image is taken.

Preferably, it can be provided that in the second test step the relative positions of the edges of (only) the anodes can be determined, which can be advantageous in particular due to the preferably intended average absorption behavior and the average size of the large areas of the anodes.

The second tolerance range (i.e., of the various detected edges) can be determined by adjusting and, in particular, reducing a (pre-)defined output tolerance range based on a distance of the corresponding edges determined in the first test step. As a result, deviations in the positions of these edges, which were determined during the first test step, can be used to adjust the second tolerance range, thus achieving a better test result in the second test step of the inventive method.

When performing a method according to the invention, it is preferably provided to use an X-ray detector comprising at least (and preferably exactly) two line detectors perpendicular to each other. Such an X-ray detector makes it advantageous to detect the edges considered with regard to their positions, in particular by means of a purely translational movement of the battery cell stack relative to the X-ray detector. It is particularly preferable that the battery cell stack is moved relatively at least once in a vertical direction by a linear detection area of each of the line detectors. It may be provided that only the battery cell stack or only the X-ray detector (and then also the X-ray emitter) or the battery cell stack and the X-ray detector (with the X-ray emitter) are moved, as is preferably provided.

A method according to the invention also advantageously enables the simultaneous testing of several and in particular two battery cell stacks at the same time during the second test step, which is made possible in particular by the simplified testing with regard to the positions of only one type of battery cell layers and the resulting relatively simple and in particular purely translational relative movement of the battery cell stacks relative to the X-ray. By testing multiple battery cell stacks at the same time, the time required to test multiple battery cell stacks can be kept relatively low.

A further improvement of the accuracy of the test of the battery cell stack according to the invention can be achieved if the several usable battery cells are stacked in a known order, i.e., in an order known after stacking, to the at least one battery cell stack and the second test step is carried out at least twice in different positions of the battery cell stack relative to the X-ray emitter and by a comparison of the results of these at least two second test steps, the determined positions of the edges are assigned to the various battery cells. In particular, this makes it possible to determine which of the battery cells in the battery cell stack have the greatest distances between the edges under consideration and at what position or level they are arranged within the battery cell stack.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 7 to 11: show different positions of the battery cell stack relative to an X-ray detector of an X-ray system according to an example;

FIGS. 12 to 16: show different positions of the battery cell stack relative to X-ray detectors of an X-ray system according to an example;

DETAILED DESCRIPTION

Figure 2:
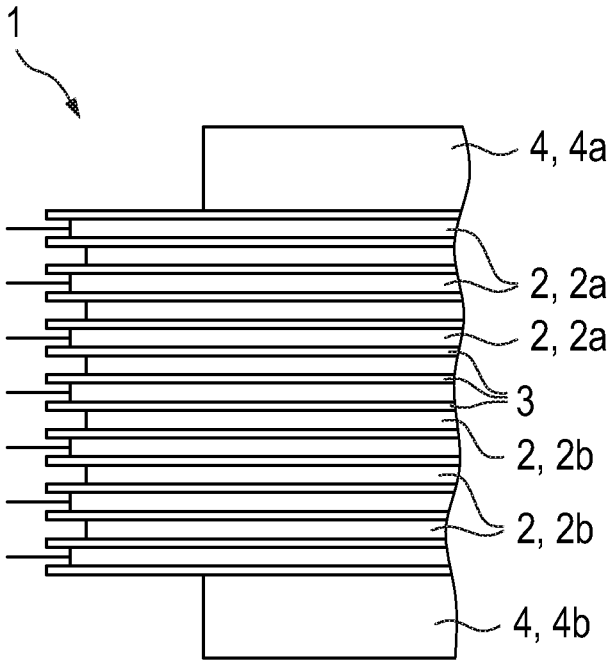
FIG. 2: shows a cross-section of a section of the stack of battery cells and the work holder.

In the context of battery cell production, battery cell stacks 1, also referred to as electrode-separator composites (ESVs), can be produced according to FIG. 2. These are stacks 1 of several battery cells, comprising, in alternating order, battery cell layers in the form of plate-shaped electrodes 2 (again alternating in designs and arrangements corresponding to intended uses as anodes 2a and cathodes 2b of the battery cells) and electrically insulating plate-shaped separators 3, wherein the electrodes 2 and separators 3 have large rectangular areas. It is provided that the anodes 2a, the cathodes 2b and the separators 3 will have different large areas in order to avoid a short circuit between adjacent anodes 2a and cathodes 2b as well as excessive losses with regard to the electrical performance of the battery cells, despite inaccuracies in the stacking that are at least still within appropriate tolerance ranges. According to FIG. 2, it can be provided that the cathodes 2b have the smallest large areas and the separators 3 the largest large areas, resulting in a complete peripheral protrusion (i.e., both in terms of the widths and lengths of the battery cell layers) of anodes 2a with respect to cathodes 2b on the one hand and of separators 3 with respect to anodes 2a (and thus also of cathodes 2b) on the other.

The plate-shaped separators 3 can also be, at least in part, sections of a meandering separator strip. The protruding edges of adjacent separators 3 may also be glued.

Figure 1:
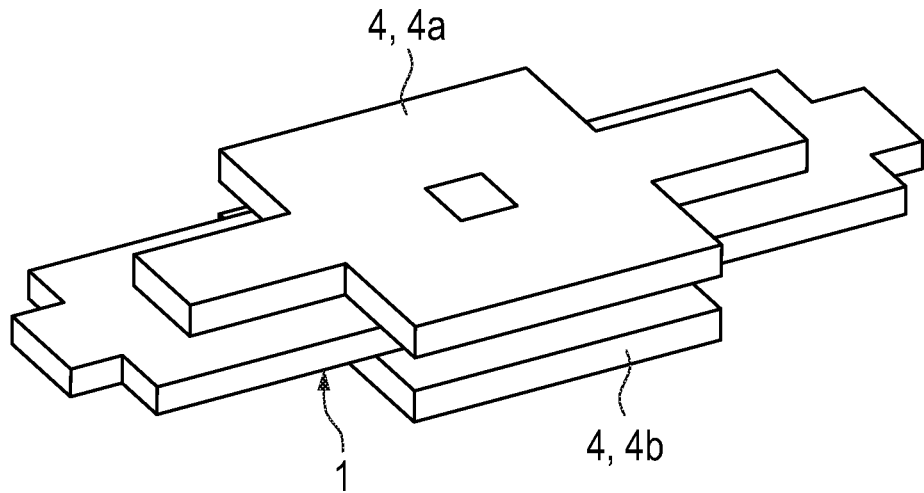
FIG. 1: shows a stack of battery cells clamped in a work holder.

After a stacking process, a battery cell stack 1 is fixed between a lid 4a and a base 4b of a work holder 4 (see FIG. 1). Two centering holes can be provided in the base 4b of the work holder 4, which are used for reproducible positioning of the work holder 4 during the stacking process as well as during irradiation of the battery cell stacks 1 with X-rays, which serves to test for a sufficiently precise stacking of the battery cell layers 1, within the framework of a method according to the invention. The geometry of the work holder 4 shown may differ. For the work holder 4, a material should be used that does not prevent an inspection by means of X-rays nor preferably obstructs or influences it to a significant extent.

Figures 3, 4:
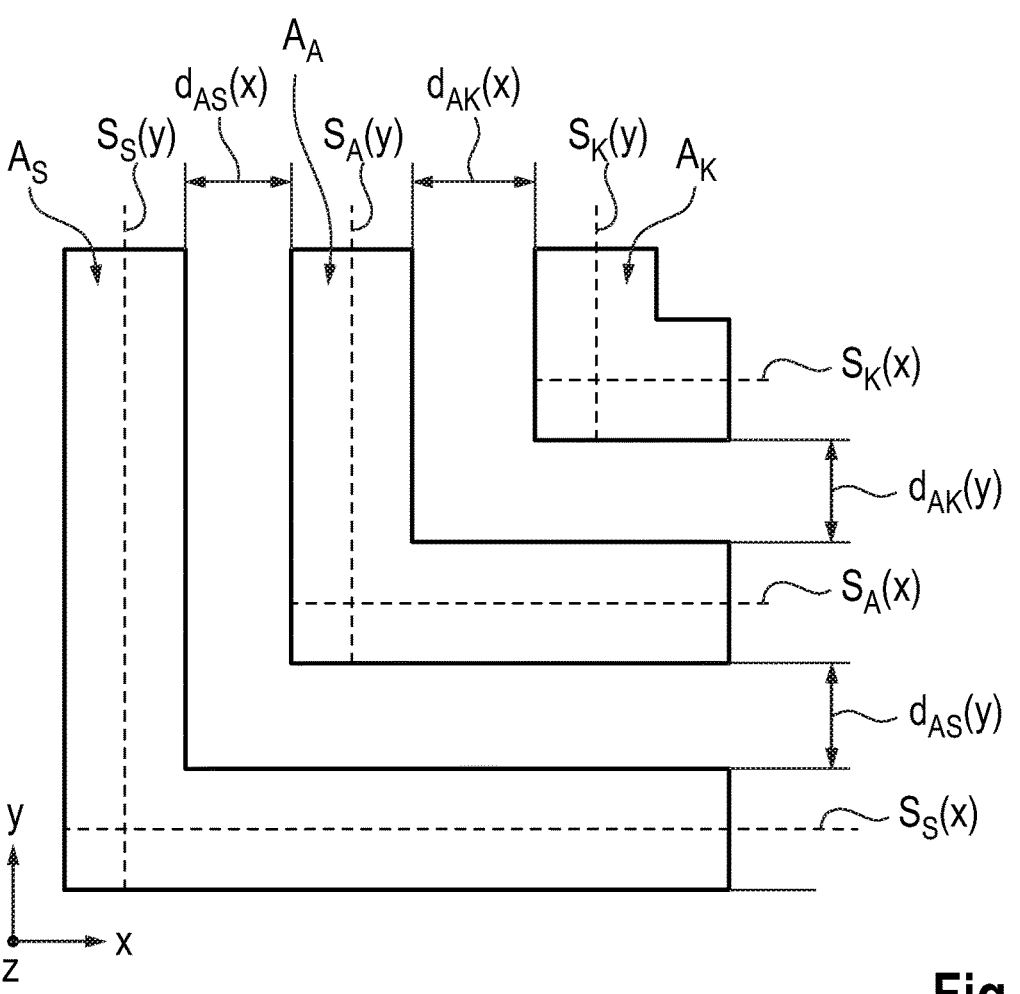
FIG. 3: shows storage areas for the cathodes, anodes and separators of the battery cell stack.
FIG. 4: shows a single battery cell and a camera system according to an example.
Figure 5:
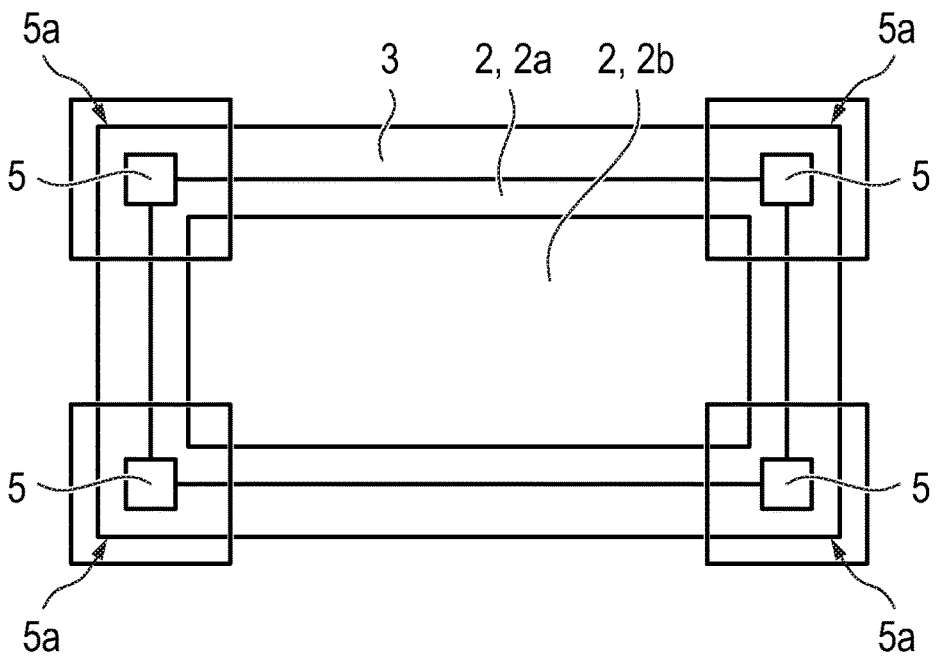
FIG. 5: shows a single battery cell and a camera system according to an example.

FIG. 3 shows possible specifications for a sufficiently precise stacking of the battery cells or the electrodes 2 and separators 3 forming them for one of the four corners of the battery cell stack, wherein these specifications should be fulfilled for all corners. Accordingly, a storage area $A_A$, $A_K$, $A_S$ may be provided for each of the anodes $2a$, the cathodes $2b$ and the separators $3$, within which the edges of these different types of battery cell layers of all battery cells are to lie. In addition, for each of the different types of battery cell layers, the optimal position $S_A$, $S_K$, $S_S$ is shown with regard to the respective width and length, wherein this optimal position $S_A$, $S_K$, $S_S$ runs centrally within the respective storage area $A_A$, $A_K$, $A_S$. For example, the widths of the storage areas $A_A$, $A_K$, $A_S$ can be 1.0 mm or ±0.5 mm on both sides of the respective optimal position $S_A$, $S_K$, $S_S$. In addition to the different storage areas $A_A$, $A_K$, $A_S$ for the different types of battery cell layers of all battery cells of a battery cell stack $1$, a minimum distance $d_{AK}$, $d_{AS}$ between the different storage areas $A_A$, $A_K$, $A_S$ can also be provided as a specification for sufficiently accurate stacking. For example, the minimum distance $d_{AK}$ between the storage area $A_A$ for anodes $2a$ and the storage area $A_K$ for the cathodes $2b$, as well as the minimum distance $d_{AS}$ between the storage area $A_A$ for the anodes $2a$ and the storage area $A_S$ for the separators $3$, can be 0.8 mm each. The chain, which includes these two minimum distances $d_{AK}$, $d_{AS}$ and the width of the storage area $A_A$ for the anodes $2a$, thus also results in a minimum distance between the storage area $A_K$ for the cathodes $2b$ and the storage area $A_S$ for the separators $3$.

By means of a combination of two test steps, the method according to the invention enables the simplest and fastest possible inspection of the battery cell stack $1$ with regard to sufficiently precise layers of all battery cell layers of the battery cell stack $1$.

In a first test step, the layers of the battery cell layers of the still isolated battery cells are determined and it is checked whether all of the edges of the different types of the battery cell layers are within a first tolerance range. These different first tolerance ranges for the different types of battery cell layers can correspond to the storage areas $A_A$, $A_K$, $A_S$ shown in FIG. $3$. Those battery cells for which this requirement is fulfilled are declared suitable for the formation of a battery cell stack $1$ and thus as usable.

The individual battery cells each comprise an anode $2a$, a cathode $2b$ and a first separator $3$, which is located between the anode $2a$ and the cathode $2b$. Preferably, each of the individual battery cells also includes a second separator $3$, which is located on the side of the cathode $2b$ or, preferably, anode $2a$, facing away from the first separator $3$. By integrating such a second separator $3$ into the individual battery cells, their stacking to the battery cell stack $1$, which follows the first test step as a method step, can be simplified, because the battery cells can be stacked directly on top of each other without having to additionally insert a separator $3$ between the previously separated battery cells.

The first test step is carried out using an optical camera system (see FIGS. $4$ and $5$), by means of which at least one image of the individual battery cells is taken and evaluated. A first light source can preferably be arranged on the same side with respect to the individual battery cells as at least one camera $5$ of the camera system and a second light source on the opposite side with respect to the individual battery cells.

On the one hand, the different sizes of the different types of battery cell layers and on the other hand, their different absorption behavior for visible light are exploited for the evaluation. The absorption behavior of the separators $3$ is so low that the electrode(s) $2$ that is/are covered by at least one of the separators $3$ is translucent and can be seen through the separators $3$. Preferably, it is provided that at least one camera $5$ of the camera system is closer to the cathode $2b$ than to the anode $2a$ when taking the image. In the picture, the cathode $2b$, which has the strongest absorption behavior for visible light, is directly recognizable in the described structure of the individual battery cells, and the anode $2a$, which has a medium absorption behavior for visible light, is visible translucent through the first separator $3$. The corresponding large areas of the different types of battery cell layers are recognizable by different dark colorations in the image and can therefore be automatically evaluated by an evaluation device $6$ of the camera system.

As long as the detection range $5a$ of the at least one camera $5$ used is large enough, the individual battery cells can also be completely captured without relative movement to this camera $5$. In order to achieve a relatively high resolution, however, it may also be provided to move the individual battery cells and at least one camera $5$ relative to each other, wherein only sections of the battery cells are captured by the at least one camera $5$. A relatively large resolution without relative motion can be achieved by using several cameras $5$, each of which can then have a detection range $5a$ that is smaller than the large areas of the battery cell layers. FIG. $5$ shows an embodiment in this respect in which a camera $5$ is assigned to each of the four corners of the individual battery cells.

After testing the individual battery cells in the first test step, the battery cells declared as usable are stacked in a defined number and optionally in a traced sequence to the battery cell stack $1$. In order to prevent the battery cell layers of the individual battery cells from shifting in relation to each other, which could falsify the result of the first test step, it may be preferably provided that the battery cell layers of the previously isolated battery cells are already immovably connected to each other, in particular glued, during the execution of the first test step.

This is followed by a second test step, in which the battery cell stack $1$ is irradiated by means of X-rays, which are detected by an X-ray detector $8$ emitted by an X-ray emitter $7$ (see FIG. $6$). It is provided that the X-ray radiation is oriented perpendicular to the large areas of the battery cell layers, wherein the vertical orientation refers to a central beam $9$ of the basically conical or cone-shaped X-rays. By evaluating the X-rays detected by the X-ray detector $8$, the positions of those (at least three) edges of a type of battery cell layer, in this case the anodes $2a$, are determined, which delimit at least two of the corners of these battery cell layers (anodes $2a$). Preferably, it is provided that the layers of all four edges (at least in sections) are determined with respect to at least two diagonally opposite corners of the battery cell layers. Based on this, the greatest distance $d_{max}$, which exists between the corresponding (i.e., equal) edges of all anodes $2a$, is determined (see FIG. $6$) and it is also checked whether this respective greatest distance $d_{max}$ lies within a second tolerance range $T_2$. Due to the advantageous evaluability only by the central beam $9$ of the X-rays, it is provided that the battery cell stack $1$ is moved relative to the X-ray radiation for the detection of the edges. The movement and the individual images should be synchronized so that a distortion-free image can be combined with the images of the X-ray detector $8$.

FIGS. $7$ to $11$ illustrate this procedure. According to FIGS. $7$ to $11$, the battery cell stack $1$ is moved in a targeted manner by linear detection areas of two line detectors $10$, which in combination represent the X-ray detector $8$. By moving the battery cell stack $1$ through the detection areas of the line detectors $10$, a flat detection area is obtained. The line detectors $10$ are arranged perpendicular to each other and in a cross shape. The movement of the battery cell stack 1 is perpendicular to the detection area of one of the line detectors 10.

Instead of line detectors 10, one area detector or several area detectors can also be used.

The positions of all four edges of all anodes 2a are determined. It is not necessary to capture the edges along their entire length. However, capturing as large a section of it as possible can have a beneficial effect on the detection result, so that, for example, according to FIGS. 7 and 11, two different sections of the edges running in the longitudinal directions are determined one after the other and the corresponding partial results are linked together to determine a single edge course.

FIGS. 12 to 16 show a detection of the four edges (section-by-section) of the anodes 2a, similar to FIGS. 7 to 11, wherein in this case two X-ray detectors 8 are used, each consisting of two line detectors 10, which are arranged in a T-shape. These two X-ray detectors 8 can each be combined with one X-ray emitter, wherein a central beam of X-ray radiation emitted by the respective X-ray emitter may be arranged at the intersection of the T-shaped arrangement of each of the two line detectors 10. In principle, it is also possible to use only one T-shaped X-ray detector 8 and thus only one assigned X-ray emitter according to FIGS. 12 to 16.

FIGS. 17 to 22 show a similar detection of the edges (in sections) of the anodes 2a, similar to FIGS. 7 to 11, wherein in this case by means of two X-ray detectors 8, each of which comprises crosswise arrayed line detectors 10, two of a plurality (a total of five are shown) of battery cell stacks 1 are simultaneously detected. For a better understanding of the movements of the individual battery cell stacks 1, these are numbered I-V.

Two line detectors 10 of an X-ray detector 8 can also be arranged in an L-shape.

If a rotation of the battery cell stack is performed between two acquisitions of edges, the method can also be performed with a single line detector 10.

The line detectors can also be designed to be so long that they can capture the entire length of an edge in one pass.

Point detection may also be sufficient. This applies at least if at least two point acquisitions are carried out per edge.

Figure 6:
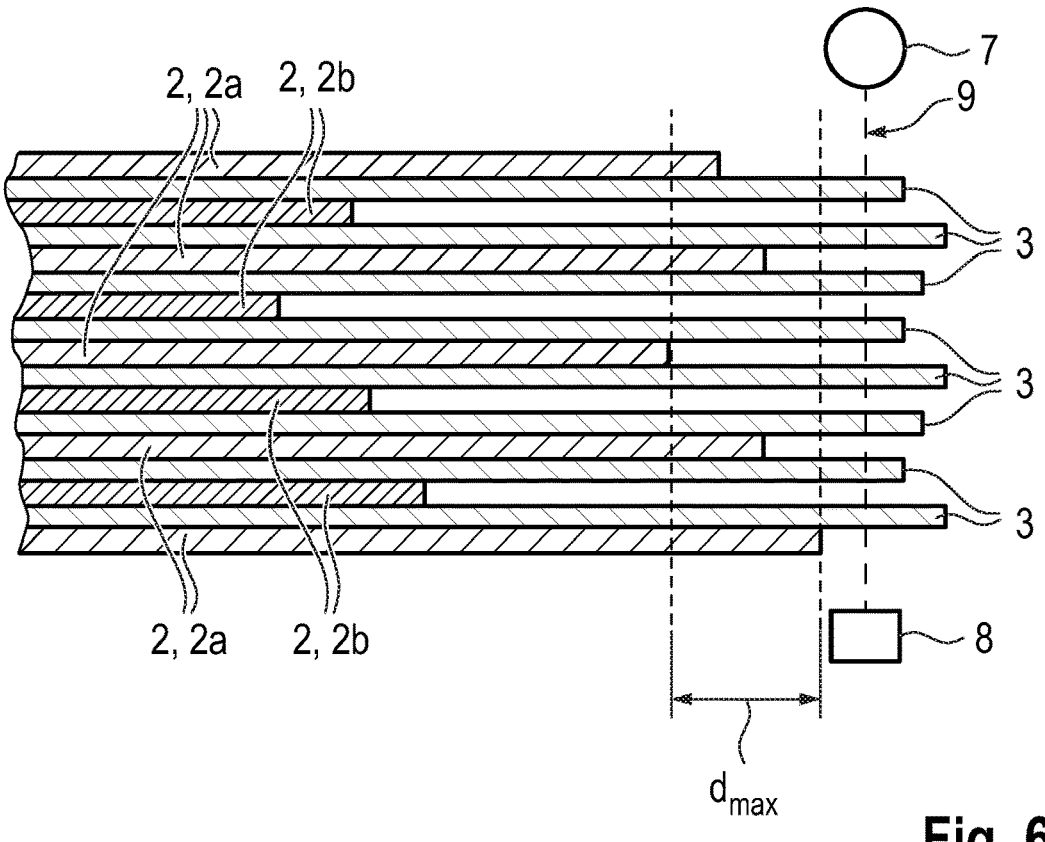
FIG. 6: shows the stack of battery cells and an X-ray system.
Figure 17:
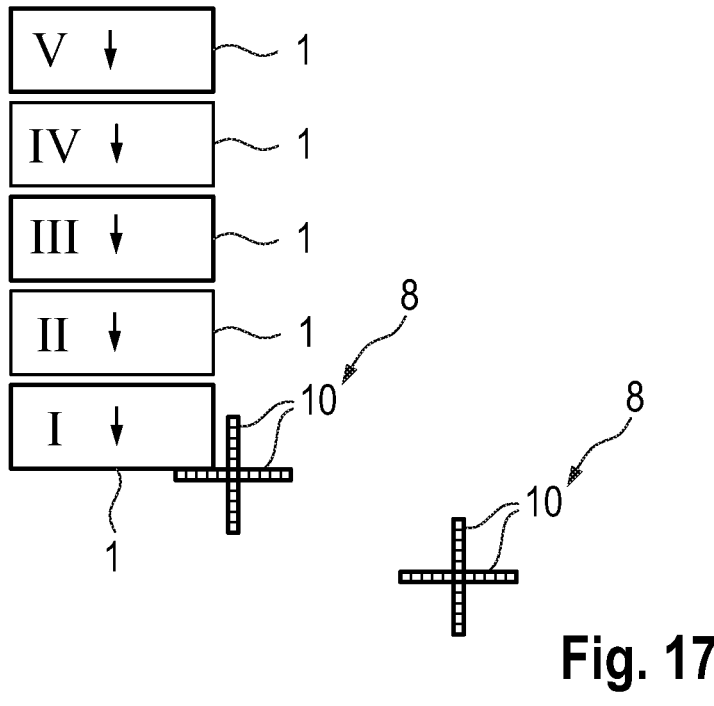
FIGS. 17 to 22: show different positions of several battery cell stacks relative to X-ray detectors of an X-ray system according to an example.
Figure 18:
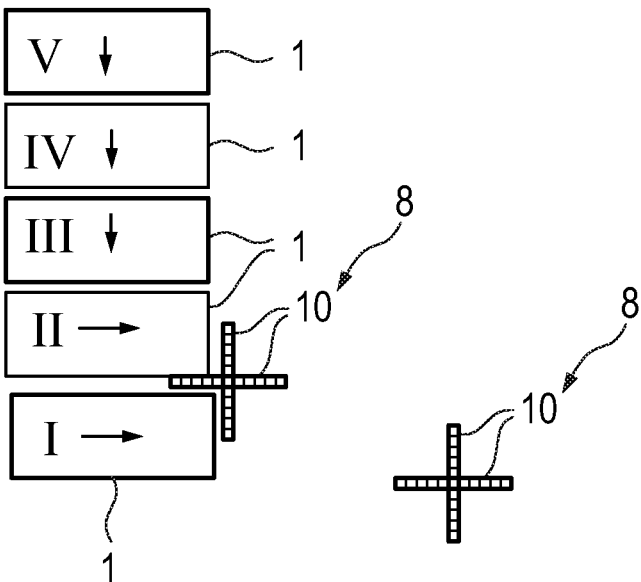
Figure 19:
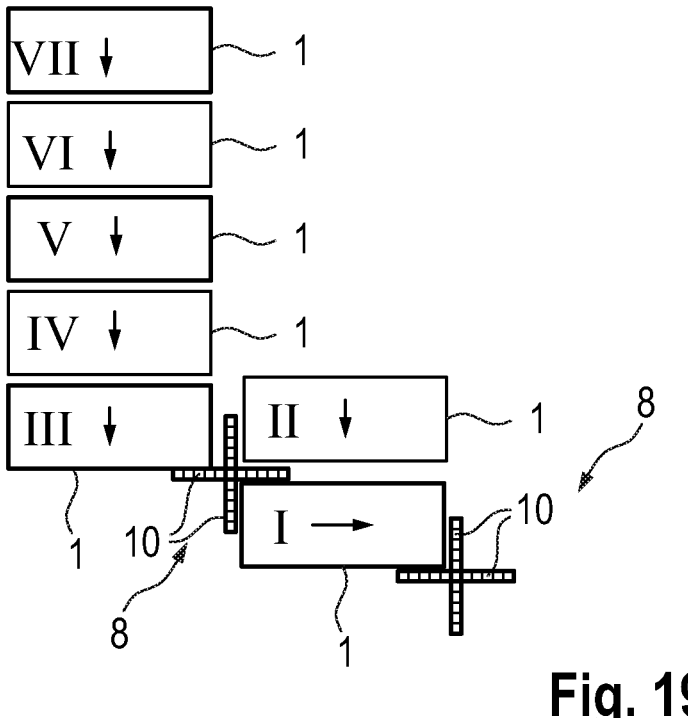
Figure 20:
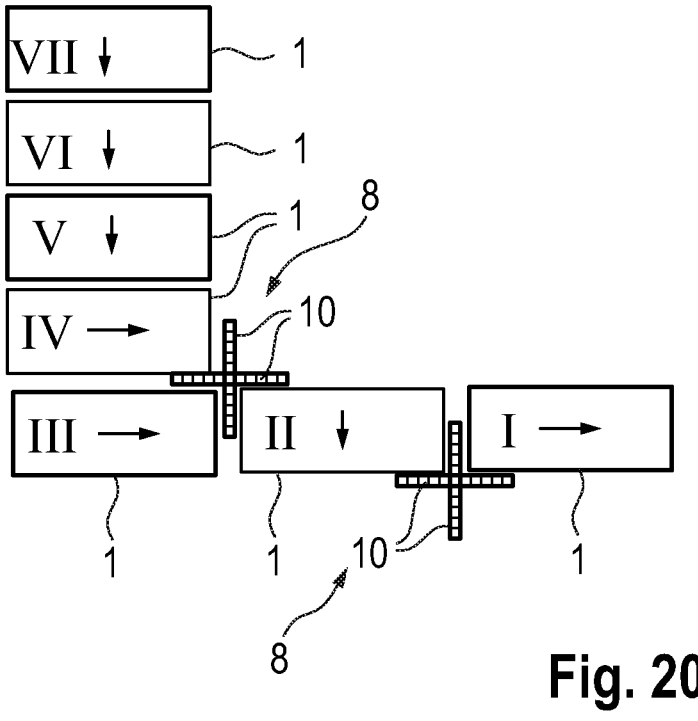
Figure 21:
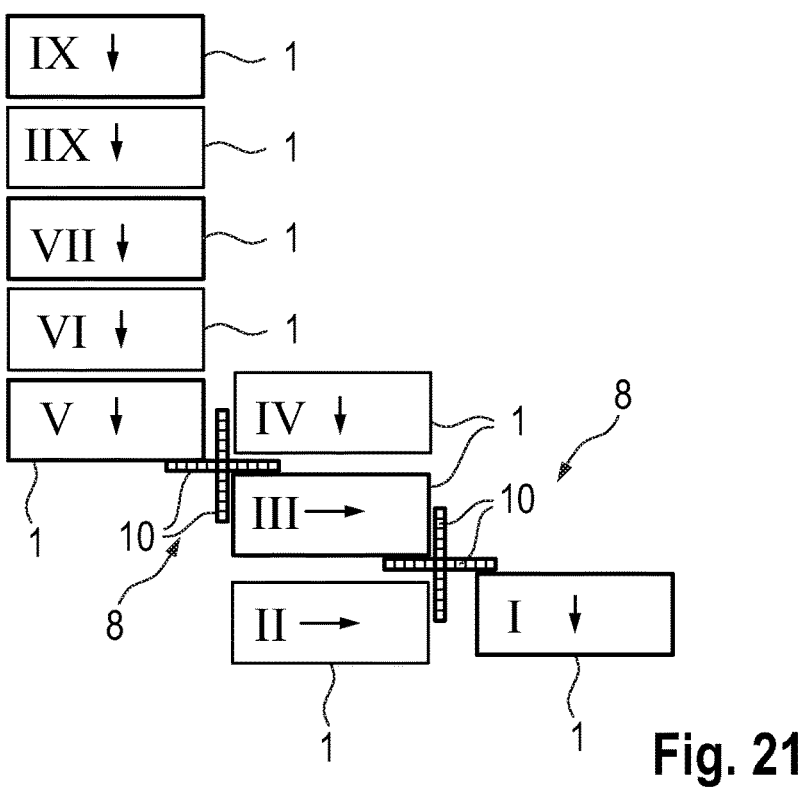
Figure 22:
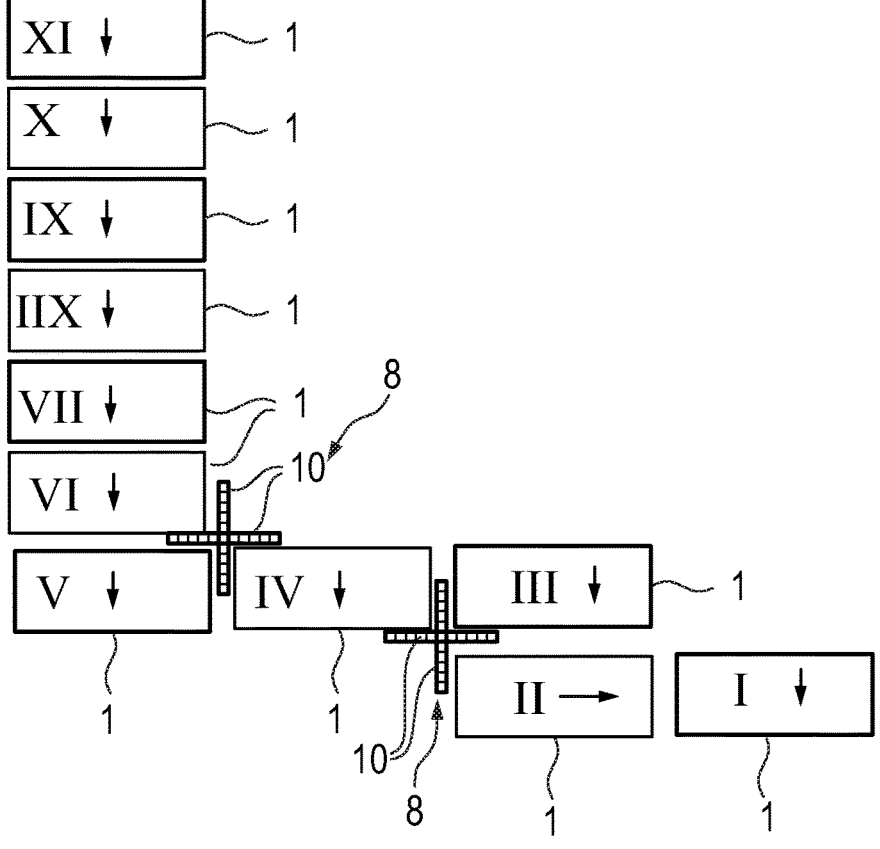

A differentiation of the edges of the different types of battery cell layers in the evaluation of the X-rays detected by the X-ray detector 8 is in turn based on different absorption behaviors that the different types of battery cell layers have for X-rays due to the different materials from which they are formed. In particular, it may be provided that the X-rays are essentially not absorbed by the separators 3 but absorbed by the anodes 2a to a medium extent and by the cathodes 2b to a relatively high extent. This makes it advantageous to determine the greatest distance between the different (identical) edges of all anodes 2a. Different dark values in an area in which these edges lie are evaluated, wherein the positions of the observed edges of all anodes 2a can be determined due to the only partially but simultaneously sufficiently high absorption of the X-ray radiation by the anodes 2a, since a clear distinction can be made between them. This only does not apply if two or more edges are exactly and directly on top of each other. Consequently, the positions of those two edges that have the greatest distance $d_{max}$ to each other and thus this distance $d_{max}$ itself can be determined (cf. FIG. 6). This determination with regard to the edges of the anodes 2a is not prevented by the relatively highly absorbent cathodes 2b due to their relatively small size (as compared to the anodes 2a) of their large areas. The same applies to the separators 3, whose large areas are larger than those of the anodes 2a, but which at the same time essentially do not absorb the X-rays and thus do not prevent the edges of the anodes 2a from being detected as a result of sufficiently clearly recognizable, erratic changes in the absorption of the detected X-rays.

In addition, the length or width of the associated anodes 2a can be determined by the distance of two opposing edges of the anode edges having the distance $d_{max}$. If these values are also recorded during the first test step, a comparison can lead to a clear assignment to one or more anodes 2a in the battery cell stack 1.

The maximum displaced cathode can also be determined with a high contrast, so that a direct check of the minimum distance between the anode and the cathode can be performed.

Figure 23:
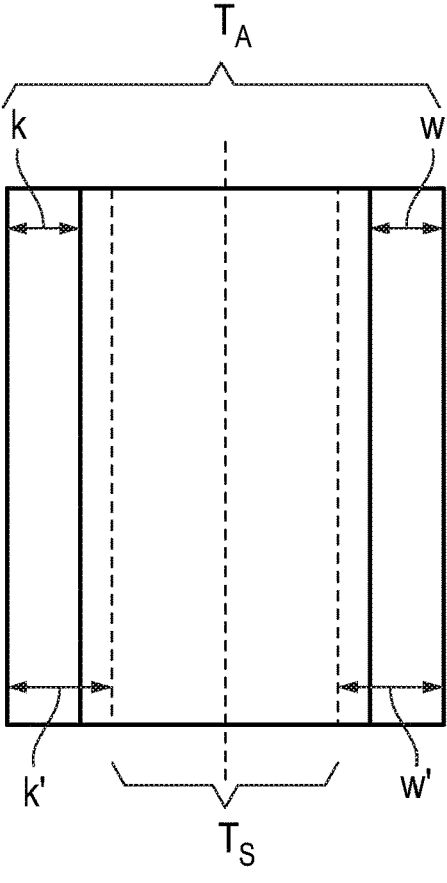
FIG. 23: shows a representation to determine a (second) tolerance range.
Figure 24:
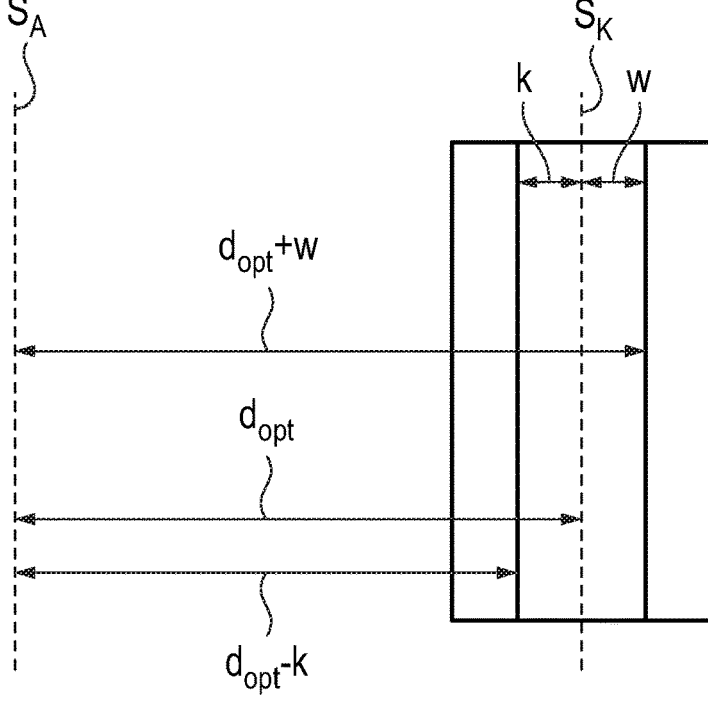
FIG. 24: shows a representation of deviations of the positions of adjacent edges of a cathode and an anode of a battery cell.

The second tolerance range $T_2$ is determined for each of the edges under consideration by adjusting a defined output tolerance range $T_A$ based on a distance of the equally located edges of the battery cell layers determined in the first test step. FIG. 23 shows the output tolerance range $T_A$ with respect to one of the considered edges of the anodes 2a, wherein this is a section (with unchanged width) of the storage area $A_A$ for the anodes 2a according to FIG. 4. The second tolerance range $T_2$ is within the first tolerance range $T_A$, but is smaller on the edge side by one deviation k, w. These deviations k, w were determined in the first test step and represent the largest deviation between the actual distances of the edges of the cathode 2b and the anode 2a of the battery cells determined for all usable battery cells of a battery cell stack 1 from the optimal distance (i.e., the distance between the optimal positions $S_A$, $S_K$ of the edges of the cathode 2b and the anode 2a) $d_{opt}$ in the different directions (k: closer to each other; w: further apart from each other) (cf. FIG. 24). A corresponding adjustment of the output tolerance range $T_A$ to determine the second tolerance range $T_2$ can also be made using the largest deviation between the actual distances of the edges of the at least one separator 3 and the anode 2a of the battery cells from the optimal distance in the different directions determined for all usable battery cells of a battery cell stack 1. This makes it possible to determine deviations k' and w', which also reduce the output tolerance range $T_A$ on the edge side. The largest of the reductions k and k' on the one hand and w and w' on the other then determine the limits of the second tolerance range $T_2$.

Figure 25:
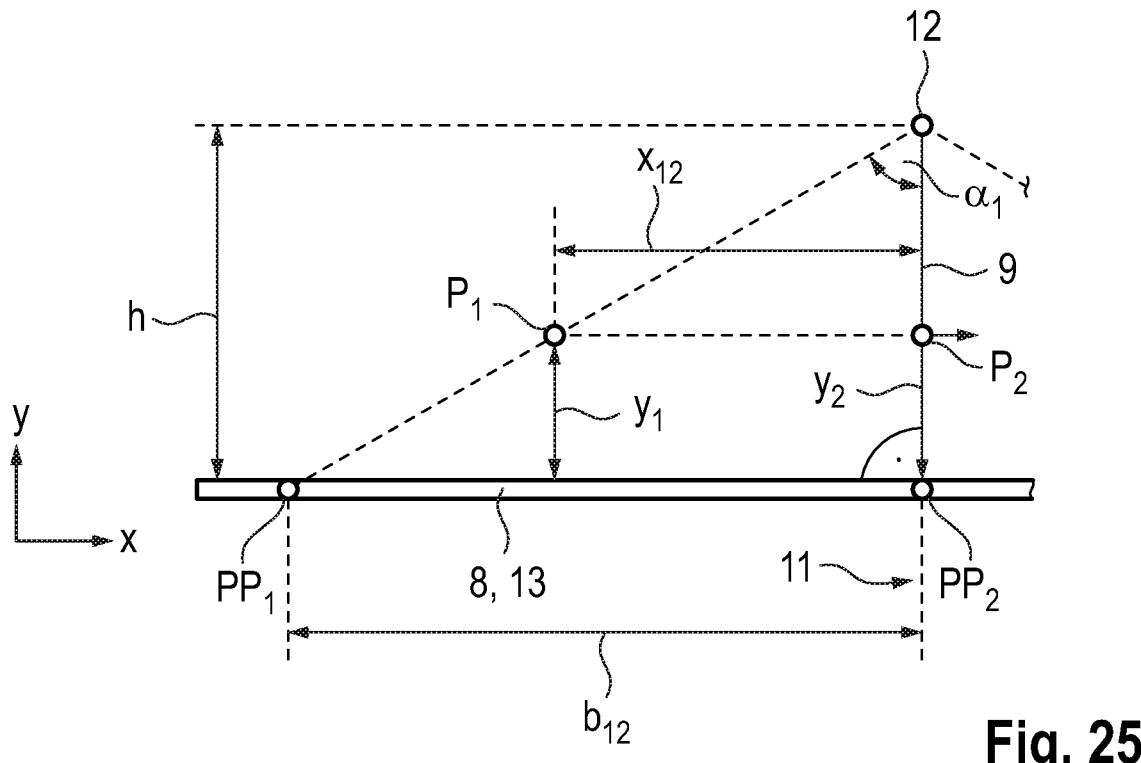
FIG. 25: shows geometrical relationships in the determination of spatial positions of an edge via the X-ray system.

FIG. 25 shows how the heights of the observed edges of the anodes 2a within the battery cell stack 1 can be determined by exploiting the parallax effect in the second test step. An edge, which can be seen as a point when viewed exactly from the side, is projected onto the detection area of the X-ray detector 8 at a first position $P_1$ and at a second position $P_2$ defined by a central beam plane 11, from which the projection lines $PP_1$ and $PP_2$ are determined. A (reference-) coordinate system is preferably located in $PP_2$, wherein the projection lines run in the z-direction and perpendicular to the x-direction. Due to the known arrangement of the X-ray detector 8 relative to the focus point 12 of the X-ray emitter 7 and the knowledge of the speed of movement of the edge in only the x-direction, h, $x_{12}$, $b_{12}$ and thus also the opening angle $\alpha_1$ in the yx plane are known. With these known quantities, the formula:

$$y_1 = y_2 = h * \left(1 - \frac{x_{12}}{b_{12}}\right)$$

can be used to determine the direct distance $(y_1, y_2)$ of the edge from the detection area of the X-ray detector 8 (in the y-direction of the coordinate system). It can be roughly assumed that this distance does not change $(y_1 \approx y_2)$.

As an alternative to the use of an area detector 13 according to FIG. 25, at least two line detectors 10 can also be used to enable the detection of the spatial position of the observed edge at least twice.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for testing a battery cell stack of at least two battery cells, each of the at least two battery cells comprising an electrode designed as an anode, an electrode designed as a cathode and at least one separator as different types of plate-shaped battery cell layers, the separator being arranged between the electrodes, and each of the different types of plate-shaped battery cell layers having polygonal surface areas of different sizes and each of the different types of plate-shaped battery cell layers are stacked in a direction perpendicular to the surface areas, the method comprising:

determining, in a first test step, the positions of the plate-shaped battery cell layers of each of the at least two battery cells and checking whether edges of the plate-shaped battery cell layers of each of the at least two battery cells are within a first tolerance range, wherein when the plate-shaped battery cell layers of the at least two battery cells are within the first tolerance range, the at least two battery cells are determined to be usable battery cells;

stacking the at least two battery cells determined to be usable battery cells in the first step to make the battery cell stack;

irradiating, in a second test step, the battery cell stack via X-rays emitted by an X-ray emitter and detecting the emitted X-rays via an X-ray detector, the X-rays being directed substantially perpendicular with respect to the surface areas of the plate-shaped battery cell layers; and determining, via the detected X-rays, the positions of edges that delimit at least two corners of plate-shaped battery cell layers of a selected type of the different types of plate-shaped battery cell layers, and checking whether a greatest distance determined between the edges of all of the plate-shaped battery cell layers of the selected type is within a second tolerance range, wherein when the greatest distance determined between the edges of all of the plate-shaped battery cell layers of the selected type is within the second tolerance range, the battery cell stack is determined to be a usable battery cell stack.

2. The method according to claim 1, wherein the plate-shaped battery cell layers are immovably connected to each other.

3. The method according to claim 1, wherein the surface areas of the anodes are larger than the surface areas of the cathodes.

4. The method according to claim 1, wherein the surface areas of the separators are larger than the surface areas of the cathodes and/or the anodes.

5. The method according to claim 1, wherein the anode is the selected type of the plate-shaped battery cell layers, such that the positions of the edges of the anodes are determined.

6. The method according to claim 1, wherein the positions of the plate-shaped battery cell layers of each of the at least two battery cells are determined based on an image of an optical camera system.

7. The method according to claim 6, wherein the image of the optical camera system is taken in incident light.

8. The method according to claim 6, wherein when the image is taken, the cathode is closer to the camera of the optical camera system than the anode.

9. The method according to claim 1, wherein the second tolerance range is determined in each case by adjusting a defined output tolerance range based on a distance of the edges determined in the first test step.

10. The method according to claim 1, wherein the X-ray detector comprises at least two line detectors arranged substantially perpendicular to each other.

11. The method according to claim 10, wherein the battery cell stack is moved relatively at least once in a substantially perpendicular direction by a line detection area of each of the at least two line detectors.

12. The method according to claim 1, wherein the usable battery cells are stacked into at least two battery cell stacks, which are simultaneously irradiated by X-rays in the second test step.

13. The method according to claim 1, further comprising:
   stacking the usable battery cells in a traced order to form the battery cell stack; and
   performing the second test step at least twice in different positions of the battery cell stack relative to the X-ray emitter, and by comparing the results of the at least two second test steps, the determined positions of the edges are assigned to the at least two battery cells.

* * * * *